United States Patent
Jin et al.

(10) Patent No.: US 10,155,889 B2
(45) Date of Patent: Dec. 18, 2018

(54) HOT MELT ADHESIVE COMPOSITION INCLUDING A BLOCK COMPOSITE COMPATIBILIZER

(71) Applicant: Dow Global Technologies LLC, Midland, MI (US)

(72) Inventors: Yi Jin, Missouri City, TX (US); Kim L. Walton, Lake Jackson, TX (US); Gary R. Marchand, Gonzales, LA (US); Selim Yalvac, Pearland, TX (US); Allan Walter Mclennaghan, Lachen (CH); Burcak Conley, Zurich (CH); Dean Lee, Midland, MI (US); Rongjuan Cong, Lake Jackson, TX (US); Colin Li Pi Shan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/505,493

(22) PCT Filed: Aug. 20, 2015

(86) PCT No.: PCT/US2015/046031
§ 371 (c)(1),
(2) Date: Feb. 21, 2017

(87) PCT Pub. No.: WO2016/028970
PCT Pub. Date: Feb. 25, 2016

(65) Prior Publication Data
US 2017/0240784 A1 Aug. 24, 2017

Related U.S. Application Data

(60) Provisional application No. 62/039,956, filed on Aug. 21, 2014.

(51) Int. Cl.
| | | |
|---|---|---|
| C09J 153/00 | (2006.01) | |
| C08L 23/14 | (2006.01) | |
| C08L 23/06 | (2006.01) | |
| C08L 91/06 | (2006.01) | |
| C09J 7/35 | (2018.01) | |
| C08L 53/00 | (2006.01) | |
| C09J 123/20 | (2006.01) | |
| C09J 123/14 | (2006.01) | |

(52) U.S. Cl.
CPC ............ *C09J 153/00* (2013.01); *C08L 23/06* (2013.01); *C08L 91/06* (2013.01); *C09J 7/35* (2018.01); *C08L 23/14* (2013.01); *C08L 23/142* (2013.01); *C08L 53/00* (2013.01); *C08L 2201/00* (2013.01); *C09J 123/142* (2013.01); *C09J 123/20* (2013.01); *C09J 2453/00* (2013.01)

(58) Field of Classification Search
None
See application file for complete search history.

(56) References Cited

U.S. PATENT DOCUMENTS

| | | | |
|---|---|---|---|
| 6,794,443 B2 | 9/2004 | Chu et al. | |
| 6,797,774 B2 | 9/2004 | Kijima | |
| 6,884,850 B2 | 4/2005 | Schauder et al. | |
| 7,262,251 B2 | 8/2007 | Kanderski et al. | |
| 7,378,481 B1 | 5/2008 | Gong et al. | |
| 7,439,307 B2 | 10/2008 | Schauder et al. | |
| 8,431,642 B2 | 4/2013 | Tancrede et al. | |
| 2005/0003197 A1 | 1/2005 | Good et al. | |
| 2006/0199879 A1 | 9/2006 | Agarwal | |
| 2006/0199897 A1* | 9/2006 | Karjala | A61L 15/58 524/543 |
| 2007/0117894 A1 | 5/2007 | Bach et al. | |
| 2007/0117906 A1 | 5/2007 | Bach et al. | |
| 2008/0269412 A1 | 10/2008 | Carnahan et al. | |
| 2009/0203847 A1 | 8/2009 | Ellis et al. | |
| 2010/0160497 A1 | 6/2010 | Karjala et al. | |
| 2011/0015338 A1 | 1/2011 | Fujimura et al. | |
| 2012/0128907 A1* | 5/2012 | Mounts | B29C 65/04 428/35.2 |
| 2013/0060215 A1 | 3/2013 | Knutson et al. | |
| 2013/0183465 A1* | 7/2013 | Liang | B32B 27/32 428/35.2 |

FOREIGN PATENT DOCUMENTS

| | | |
|---|---|---|
| CN | 101426877 A | 5/2009 |
| DE | 102008026672 A1 | 12/2009 |
| JP | 2009057397 A | 3/2009 |
| WO | 97/33921 | 9/1997 |
| WO | 2010032600 A1 | 3/2010 |
| WO | 2011/014714 A2 | 2/2011 |
| WO | 2011053406 A1 | 5/2011 |
| WO | 2014116395 A1 | 7/2014 |
| WO | 2014163758 A1 | 10/2014 |

OTHER PUBLICATIONS

PCT/US2015/046031, dated Oct. 29, 2015, International Search Report and Written Opinion.
PCT/US2015/046031, dated Mar. 2, 2017, International Preliminary Report on Patentability.

* cited by examiner

*Primary Examiner* — Richard A Huhn

(57) ABSTRACT

A hot melt adhesive (HMA) composition includes (A) from 1-60 wt % of a block composite compatibilizer comprising (i) a hard polymer that includes propylene, (ii) a soft polymer that includes ethylene, and (iii) a block copolymer having a soft block and a hard block, the hard block of the block copolymer having the same composition as the hard polymer of the block composite compatibilizer and the soft block of the block copolymer having the same composition as the soft polymer of the block composite compatibilizer; (B) from 1-70 wt % of a tackifier; (C) from 1-40 wt % of at least one selected from the group of a wax and an oil; and (D) Optionally, from greater than zero to 97 wt % of a polymer component that includes an ethylene-based polymer and/or a propylene-based polymer.

15 Claims, No Drawings

HOT MELT ADHESIVE COMPOSITION INCLUDING A BLOCK COMPOSITE COMPATIBILIZER

FIELD

Embodiments relate to hot melt adhesives (HMA). In one aspect, the HMAs include a block composite compatibilizer (BCC), a tackifier, and wax and/or oil.

INTRODUCTION

Hot melt adhesives (HMA) based on high flow, low crystallinity polyethylene polymers, such as AFFINITY™ GA 1900 or 1950, have seen considerable growth over the last decade, e.g., due to their excellent benefits in processability, adhesive performance, low cost, and/or advantages over the traditional ethylene vinyl-acetate based HMA. Despite this success, there are niche applications where customers require improved performance at high temperatures, e.g., in cardboard box packaging for warehouse storage, cook-in labels, insulation coatings for hot water or steam distribution, and hot filled container markets. One approach to improving the high temperature performance of the HMA is to add a polyethylene polymer or wax and/or a propylene-based polymer or wax. However, polyethylene polymers or wax and propylene-based polymers or wax do not blend particularly well and, thus, produce a mixture that exhibits less than desirable properties for HMA applications, such as poor fiber tear, poor peel adhesion, and increased set time. Accordingly, a need exists for HMA compositions that exhibit good adhesive properties and short set time under stress conditions, such as elevated temperatures.

SUMMARY

Embodiments may be realized by providing a HMA composition comprising:
(A) from 1-60 wt % of a block composite compatibilizer comprising (i) a hard polymer that includes propylene, (ii) a soft polymer that includes ethylene, and (iii) a block copolymer having a soft block and a hard block, the hard block of the block copolymer having the same composition as the hard polymer of the block composite compatibilizer and the soft block of the block copolymer having the same composition as the soft polymer of the block composite compatibilizer; (B) from 1-70 wt % of a tackifier; (C) from 1-40 wt % of at least one selected from the group of a wax and an oil; and, (D) optionally, from greater than zero to 97 wt % of a polymer component that includes an ethylene-based polymer and/or a propylene-based polymer.

DETAILED DESCRIPTION

Embodiments relate to a hot melt adhesive (HMA) composition that includes a block composite compatibilizer (BCC), a tackifier, and at least one selected from the group of oil and wax (i.e., may include oil and/or wax). The hot melt adhesive composition may include at least one selected from the group of a propylene-based polymer and an ethylene-based polymer (i.e., propylene-based polymer and/or an ethylene-based polymer).

Definitions

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference), especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values in increments of one unit, provided that there is a separation of at least two units between any lower value and any higher value. As an example, if a compositional, physical or other property, such as, for example, molecular weight, viscosity, melt index, etc., is from 100 to 1,000, the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated are to be considered to be expressly stated in this disclosure. Numerical ranges are provided within this disclosure for, among other things, the density and melt index of components of the compositions.

As used with respect to a chemical compound, unless specifically indicated otherwise, the singular includes all isomeric forms and vice versa (for example, "hexane" includes all isomers of hexane individually or collectively). The terms "compound" and "complex" are used interchangeably to refer to organic-, inorganic- and organometal compounds. The term "atom" refers to the smallest constituent of an element regardless of ionic state, that is, whether or not the same bears a charge or partial charge or is bonded to another atom.

"Composition" and like terms mean a mixture or blend of two or more components. For example, one composition is the combination of a random or homogeneous propylene-based interpolymer and a block composite compatibilizer (and optionally at least one tackifier and/or at least one wax and/or oil).

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer and copolymer as defined below. It also embraces all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Propylene-based polymer" and like terms mean a polymer that comprises a majority weight percent polymerized propylene monomer (based on the total amount of polymerizable monomers), and optionally comprises at least one polymerized comonomer different from propylene (such as at least one selected from a $C_2$ and $C_{4-10}$ α-olefin) so as to form a propylene-based interpolymer. For example, when the propylene-based polymer is a copolymer, the amount of propylene is greater than 50 wt % based on the total weight of the copolymer. "Units derived from propylene" and like terms mean the units of a polymer that formed from the polymerization of propylene monomers. "Units derived from α-olefin" and like terms mean the units of a polymer that formed from the polymerization of α-olefin monomers, in particular at least one of a $C_{3-10}$ α-olefin.

"Ethylene-based polymer" and like terms mean a polymer that comprises a majority weight percent polymerized ethylene monomer (based on the total weight of polymerizable monomers), and optionally may comprise at least one polymerized comonomer different from ethylene (such as at least one selected from a $C_{3-10}$ α-olefin) so as to form an ethylene-based interpolymer. For example, when the ethylene-based polymer is a copolymer, the amount of ethylene is greater than 50 wt %, based on the total weight to the copolymer. "Units derived from ethylene" and like terms mean the units of a polymer that formed from the polymerization of ethylene monomers.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene (PE) versus polypropylene (PP)), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a chain shuttling agent(s) (CSA) in combination with catalysts (such as those described in the examples).

The term "block composite" (BC) refers to polymers comprising a soft copolymer having a comonomer content (such as ethylene) that is greater than 10 mol % and less than 90 mol %, a hard copolymer having a monomer content (such as propylene), and a block copolymer (e.g., a diblock having a soft segment/block and a hard segment/block), wherein the hard segment/block of the block copolymer is essentially the same composition as the hard copolymer of the block composite and the soft segment/block of the block copolymer is essentially the same composition as the soft copolymer of the block composite. Accordingly, the term BC, for example, may refer to polymers comprising a soft copolymer having a comonomer content that is greater than 78 mol % and less than 90 mol %, a hard copolymer having a monomer content that is greater than 61 mol % and less than 95 mol %, and a block copolymer (e.g., a diblock having a soft segment/block and a hard segment/block), wherein the hard segment/block of the block copolymer is essentially the same composition as the hard copolymer of the block composite and the soft segment/block of the block copolymer is essentially the same composition as the soft copolymer of the block composite. The compositional split between the amount of soft copolymer and hard copolymer will be essentially the same as that between the corresponding blocks in the block copolymer.

The term "block composite compatibilizer" (BCC) refers to the block composite as a polymer compatibilizer.

"Hard" segments/blocks refer to highly crystalline blocks of polymerized units. The hard segments have a monomer (such as propylene) and a remainder may be a comonomer (such as ethylene). In some embodiments, the hard segments comprise all or substantially all propylene units (such as an iPP—isotactic polypropylene—copolymer or homopolymer block). "Soft" segments/blocks refer to amorphous, substantially amorphous, or elastomeric blocks of polymerized units. In the soft segments, the comonomer (such as ethylene) may be present and a remainder may be the monomer (such as propylene).

The block composites can be characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., and 10° C., also can be used):

$$ABI = \Sigma(w_i BI_i)$$

where $BI_i$ is the block index for the ith fraction of the block composite obtained in preparative TREF, and $w_i$ is the weight percentage of the ith fraction. Similarly, the square root of the second moment about the mean, hereinafter referred to as the second moment weight average block index, can be defined as follows.

$$\text{2nd moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the ATREF (i.e., analytical TREF) elution temperature for the ith fraction (preferably expressed in Kelvin) and $P_X$ is the propylene mole fraction for the ith fraction, which can be measured by NMR or IR as described below. $P_{AB}$ is the propylene mole fraction of the whole block composite (before fractionation), which also can be measured by NMR or IR. $T_A$ and $P_A$ are the ATREF elution temperature and the propylene mole fraction for pure "hard segments" (which refer to the crystalline segments of the interpolymer). As an approximation or for polymers where the "hard segment" composition is unknown, the $T_A$ and $P_A$ values are set to those for isotactic polypropylene homopolymer produced with a similar stereoregularity and tacticity as the hard block present in the block composite. In the case where the tacticity and stereoregularity is unknown or undefined, the $T_A$ and $P_A$ of an isotactic polypropylene produced by a Ziegler-Natta catalyst can be used.

$T_{AB}$ is the ATREF elution temperature for a random copolymer of the same composition (having an propylene mole fraction of $P_{AB}$) and molecular weight as the inventive copolymer. $T_{AB}$ can be calculated from the mole fraction of propylene (measured by NMR) using the following equation:

$$\text{Ln } P_{AB} = \alpha/T_{AB} + \beta$$

where $\alpha$ and $\beta$ are two constants which can be determined by a calibration using a number of well characterized preparative TREF fractions of a broad composition random copolymer and/or well characterized random propylene/ethylene or ethylene/propylene copolymers with narrow composition. It should be noted that $\alpha$ and $\beta$ may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random propylene-ethylene or ethylene-propylene copolymers and/or preparative TREF fractions of random copolymers satisfy the following relationship:

$$\text{Ln } P = -237.83/T_{A}\text{TREF} + 0.639$$

The above calibration equation relates the mole fraction of propylene, P, to the analytical TREF elution temperature, TATREF, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $L_n P_X = \alpha/T_{XO} + \beta$ from a measured $P_X$ mole fraction. Conversely, $P_{XO}$ is the propylene mole fraction for a random copolymer of the same composition (i.e., the same comonomer type and content) and the same molecular weight and having an ATREF temperature of $T_X$, which can be calculated from $L_n P_{XO} = \alpha/T_X + \beta$ using a measured value of $T_X$.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

"Q.S." or "q.s." means quantum sufficit or quantity sufficient or, in other words, enough of the ingredient, e.g., wax, is added to the HMA formulation to bring it to completion, i.e., to 100 wt %. For example, if the HMA formulation contained 30 wt % ethylene-based polymer, 10 wt % propylene-based polymer, 10 wt % BCC, and 15 wt % tackifier, then the q.s. for the wax is 35 wt %.

Block Composite Compatibilizer

The amount of block composite compatabilizer in the HMA composition is from 1 wt % to 60 wt %, based on the total weight of the HMA composition. For example, the amount of the block composite compatibilizer may be from 1 wt % to 50 wt %, 1 wt % to 40 wt %, 1 wt % to 30 wt %, 3 wt % to 50 wt %, 5 wt % to 40 wt %, 7 wt % to 35 wt %, 10 wt % to 30 wt %, 20 wt % to 30 wt %, 15 wt % to 25 wt %, 20 wt % to 25 wt %, 10 wt % to 20 wt %, and/or 5 wt % to 15 wt %, based on the total weight of the composition. In exemplary embodiments, the ratio of the total amount of the propylene-based polymer and/or ethylene-based polymer to block composite compatibilizer in the HMA composition may be from 95:5 to 60:40. In further exemplary embodiments, the ratio of the total amount of the propylene-based polymer and/or ethylene-based polymer to block composite compatibilizer in the HMA composition may be from 95:5 to 40:60 (e.g., from 80:20, from 75:25, from 50:50, and/or from 45:55).

In exemplary embodiments, the block composite may have a total ethylene content that is from 30 wt % to 70 wt % (e.g, 30 wt % to 65 wt %, 35 wt % to 60 wt %, 40 wt % to 60 wt %, 40 wt % to 55 wt %, and 40 wt % to 50 wt %) based on the total weight of the block composite. The remainder of the total weight of the block composite may be accounted for by units derived from at least one $C_{3-10}$ α-olefin. For example, the remainder of the total weight may be accounted for by units derived from propylene.

In exemplary embodiments, the block composite as discussed herein with respect to a block composite compatibilizer (BCC) refers to polymers comprising a soft copolymer in which the comonomer (such as ethylene) content is greater than 10 wt % and less than 95 wt %, a hard polymer in which the monomer (such as propylene) is present in an amount greater than 80 wt % and up to 100 wt %, and a block copolymer, such as a diblock, having a soft segment and a hard segment, wherein the hard segment of the block copolymer is essentially the same composition as the hard copolymer of the block composite and the soft segment of the block copolymer is essentially the same composition as the soft copolymer of the block composite. Herein, "hard" segments/blocks refer to highly crystalline blocks of polymerized units. In the hard segments, the monomer (such as propylene) may be present in an amount greater than 80 wt % (e.g., greater than 85 wt %, greater than 90 wt %, greater than 95 wt %, and/or greater than 98 wt %). The remainder in the hard segment may be the comonomer, such as ethylene, in an amount less than 20 wt % (e.g, less than 15 wt % and/or less than 10 wt %). In some embodiments, the hard segments comprise all or substantially all propylene units, such as an iPP (isotactic polypropylene) homopolymer block or an iPP copolymer block with less than 10 wt % of ethylene. "Soft" segments/blocks refer to amorphous, substantially amorphous, or elastomeric blocks of polymerized units. In the soft segments, the comonomer (such as ethylene) may be present in an amount greater than 20 wt % and equal to or less than 100 wt % (e.g., from 50 wt % to 99 wt %, from 55 wt % to 90 wt %, from 60 wt % to 85 wt %, and/or from 60 wt % to 80 wt %). The remainder in the soft block may be the monomer, such as propylene.

According to an exemplary embodiment, the block composite compatibilizer includes a propylene-ethylene block composite compatibilizer comprising a block copolymer having 30-70 wt % hard block and 30-70 wt % soft block (in addition to a propylene based polymer and an ethylene based polymer present within the block composite compatibilizer). For example, the block copolymer may include 40-60 wt % and/or 45-55 wt % of the hard block and 40-60 wt % and/or 45-55 wt % of the soft block. The amount of the hard block may be the same as the amount of the soft block (i.e., 50 wt % to 50 wt %). The hard block may comprise 0-20 wt % (e.g., 3 wt % to 20 wt % and/or 5 wt % to 15 wt %) units derived from ethylene and remainder derived from propylene. The soft block may be 50-84 wt % (e.g., greater than 60 wt % and less than 84 wt %) units derived from ethylene and remainder derived from propylene.

According to another exemplary embodiment, the block copolymer has the formula (EP)-(iPP), in which EP represents a soft block of polymerized ethylene and propylene monomeric units (e.g., 50-84 wt % of ethylene and remainder propylene) and iPP represents a hard block of isotactic propylene homopolymer or isotactic propylene copolymer (e.g., less than 10 wt % of ethylene and remainder propylene). According to a further exemplary embodiment, the block copolymer has the formula (EP)-(iPP), in which EP represents a soft block of polymerized ethylene and propylene monomeric units (e.g., 65-80 wt % of ethylene and remainder propylene) and iPP represents a hard block of isotactic propylene homopolymer or isotactic propylene copolymer (e.g., less than 8 wt % of ethylene and remainder propylene). In hot melt adhesive compositions, it is believed the EP block provides low temperature flexibility and the iPP block provides high temperature resistance. Accordingly, these two phases may be compatible and deliver improved mixing, robust processability, and good mechanical properties sought in hot melt adhesives. Further, the crystallization of the iPP block and the EP block may be individually tuned to satisfy a wide range of open time and set time requirements for many different market segments. The EP-iPP diblock may be used alone in the HMA composition or may be combined with an ethylene-based polymer and/or propylene-based polymer. For example, the EP-iPP diblock may be used with the ethylene-based polymer and the propylene-based polymer may be excluded in the HMA composition; the EP-iPP diblock may be used with a blend of the ethylene and propylene based polymers; or the EP-iPP diblock may be used with the propylene-based polymer and the ethylene-based polymer may be excluded in the HMA composition.

According to another exemplary embodiment, the block copolymer has the formula (EP)-(PE), in which EP represents a soft block of polymerized ethylene and propylene monomeric units (e.g., 50-84 wt % of ethylene and remainder propylene) and PE represents a hard block of polymerized propylene and ethylene monomeric units (e.g., 3 wt % to 20 wt % of ethylene and remainder propylene). In hot melt adhesive compositions, it is believed the EP block provides low temperature flexibility and the PE block provides high temperature resistance. Accordingly, these two phases may be compatible and deliver improved mixing, robust processability, and good mechanical properties sought in hot melt adhesives. Further, the crystallization of the PE block and the EP block may be individually tuned to satisfy a wide range of open time and set time requirements for many different market segments. The EP-PE diblock may be used alone in the HMA composition or may be combined with an ethylene-based polymer and/or propylene-based polymer. For example, the EP-PE diblock may be used with the ethylene-based polymer and the propylene-based polymer may be excluded in the HMA composition; the EP-PE diblock may be used with a blend of the ethylene and propylene based polymers; or the EP-PE diblock may be used with the propylene-based polymer and the ethylene-based polymer may be excluded in the HMA composition.

In one exemplary design of the block composite compatibilizer, the block copolymer included therein has a 50/50 (soft/hard) block ratio, with the hard block being propylene ethylene with 6 wt % ethylene and the soft block being ethylene propylene with 65 wt % ethylene. In a second exemplary design, the block copolymer has a 50/50 (soft/hard) block ratio, with the hard block being propylene ethylene with 14 wt % ethylene and the soft block being ethylene propylene with 75 wt % ethylene. In a third exemplary design, the block copolymer has a 85/15 (soft/hard) block ratio, with the hard block being propylene ethylene with 0 wt % ethylene and the soft block being ethylene propylene with 65 wt % ethylene. In a fourth exemplary design of the block composite compatibilizer, the block copolymer included therein has a 50/50 (soft/hard) block ratio, with the hard block being iPP with 8 wt % ethylene and the soft block being ethylene propylene with 84 wt % ethylene. In a fifth exemplary design of the block composite compatibilizer, the block copolymer included therein has a 50/50 (soft/hard) block ratio, with the hard block being iPP with 6% ethylene and the soft block being ethylene propylene with 80 wt % ethylene. In a sixth exemplary design of the block composite compatibilizer, the block copolymer included therein has a 50/50 (soft/hard) block ratio, with the hard block being iPP with 4% ethylene and the soft block being ethylene propylene with 75 wt % ethylene.

The weight average molecular weight (Mw) of the block composite compatibilizers may be at least 15,000, at least 20,000, and/or at least 25,000 in grams per mole (g/mol). The maximum Mw of the block composite compatibilizers may not exceed 60,000, may not exceed 45,000, and/or may not exceed 30,000 in grams per mole (g/mol). The molecular weight distribution or polydispersity or Mw/Mn of the block composite compatibilizers may be less than 5, between 1 and 5, and/or between 1.5 and 4. Weight average molecular weight (Mw) and number average molecular weight (Mn) are well known in the polymer art and can be determined by known methods.

The melt index ($I_2$) of the block composite compatibilizers may be from 5 g/10 min to 3,000 g/10 min. For example, the melt index may be at least 300 g/10 min, at least 400 g/10 min, or at least 500 g/10 min. The maximum melt index may not exceed 2,000 g/10 min. The melt index is measured by ASTM D1238 (Condition E) (190° C./2.16 kg). The block composite compatibilizers may have a Brookfield viscosity (at 350° F./177° C. as measured using a Brookfield viscometer) of less than 50,000 centipoise (cP). For example, the Brookfield viscosity may be greater than 5,000 cP and less than 30,000 cP (e.g., between 10,000 cP and 25,000 cP).

The density of the block composite compatibilizers may be between 0.850 and 0.900 g/cc. In exemplary embodiments, the density of the block composite compatibilizers is from 0.860 to 0.895, from 0.865 to 0.895, and/or from 0.865 to 0.890 g/cc. Density is determined in accordance with ASTM D792-00, Method 13.

The block composite compatibilizers may have a Tm of greater than 80° C., greater than 85° C., and/or greater than 90° C. and a Tc of from 60° C. to less than 100° C.

Block composite compatibilizer may be differentiated from conventional, random copolymers, and physical blends of polymers. The block composites compatibilizer may be differentiated from random copolymers and from a physical blend by characteristics such as microstructure index, better tensile strength, improved fracture strength, finer morphology, improved optics, and/or greater impact strength at lower temperature. For example, the block composite compatibilizers include a block copolymer having distinct regions or segments (referred to as "blocks") joined in a linear manner. The blocks differ, e.g., in the type of crystallinity such as polyethylene (PE) versus polypropylene (PP). The block copolymers can be linear or branched. When produced in a continuous process, the block composites may possess PDI from 1.7 to 15 (e.g., from 1.8 to 10, from 1.8 to 5, and/or from 1.8 to 3.5). When produced in a batch or semi-batch process, the block composites may possess PDI from 1.0 to 2.9 (e.g., from 1.3 to 2.5, from 1.4 to 2.0, and/or from 1.4 to 1.8). Exemplary block composites are described in, e.g., U.S. Patent Application Publication No. 2014/0174509, incorporated herein by reference with respect to, for example, processes to make them and methods of analyzing them.

In some embodiments, the block composite compatibilizer may have a microstructure index greater than 1 and equal to or less than 20 (e.g., from 1.5 to 19.5 and/or from 1.75 to 19.5). The microstructure index is an estimation using solvent gradient interaction chromatography (SGIC) separation to differentiate between block copolymers from random copolymers. In particular, microstructure index estimation relies on differentiating between two fractions, i.e., a higher random copolymer content fraction and a higher block copolymer content fraction, of which the random copolymer and the block copolymer have essentially the same chemical composition. The early eluting fraction (i.e., the first fraction) correlates to random copolymers and the late eluting component (i.e., the second fraction) correlates to block copolymers. The calculation of the microstructure index is discussed below.

In some embodiments, the block composite compatibilizer may have a Block Composite Index (BCI), as defined below, that is greater than zero and less than 1.0. For example, the BCI may be from 0.4 to 0.7, from 0.5 to 0.7, and/or from 0.6 to 0.9. In some embodiments, BCI is from 0.3 to 0.9, from 0.3 to 0.8, and/or from 0.3 to 0.7, from 0.3 to 0.6, from 0.3 to 0.5, from 0.3 to 0.4, from 0.4 to 0.99, from 0.5 to 0.99, and/or from 0.6 to 0.99. The BCI is based on showing that the insoluble fractions contain an appreciable amount of ethylene that would not otherwise be present if the polymer were simply a blend of iPP homopolymer and EP copolymer.

In some embodiments, the block composite compatibilizer may have a modified Block Composite Index (MBCI), as defined below, that is greater than zero and less than 1.0. For example, the MBCI may be from 0.3 to 0.9, from 0.4 to 0.8, from 0.5 to 0.7, and/or from 0.6-0.7.

The block composite compatibilizers may be prepared by a process comprising contacting an addition polymerizable monomer or mixture of monomers under addition polymerization conditions with a composition comprising at least one addition polymerization catalyst, one or more cocatalyst (e.g., two cocatalysts) and a chain shuttling agent (CSA). The process may be characterized by formation of at least some of the growing polymer chains under differentiated process conditions in two or more reactors operating under steady state polymerization conditions or in two or more zones of a reactor operating under plug flow polymerization conditions. The term "chain shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the block composites comprise a fraction of block polymer which possesses a most probable distribution of block lengths.

Suitable processes useful in producing the block composite compatibilizers may be found, e.g., in U.S. Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions and, preferably, is a most probable distribution of polymer sizes.

Exemplary catalysts and catalyst precursors for use to form the block composites include metal complexes such as disclosed in, e.g., International Publication No WO 2005/090426. Other exemplary catalysts are also disclosed in U.S. Patent Publication Nos. 2006/0199930, 2007/0167578, and 2008/0311812; U.S. Pat. No. 7,355,089; and International Publication No. WO 2009/012215.

Ethylene-Based Polymer

The ethylene-based polymer forms an entirety or a portion of an optional polymer component in the HMA composition. If present, the ethylene-based polymer may be present in the hot melt adhesive composition in an amount from 8 wt % to 97 wt %, based on the total weight of the hot melt adhesive composition. When the composition includes a combined total weight of greater than 50 wt % for the tackifier, wax, and/or oil, the amount of the ethylene-based polymer would be on the lower end of the 8 wt % to 97 wt % range. The ethylene-based polymer may have an ethylene content of, for example, at least 50 wt % based on the total weight of the ethylene-based polymer. In exemplary embodiments, the ethylene-based polymer may be blended with a propylene-based polymer in the composition, and in other embodiments the propylene-based polymer may be excluded.

Exemplary ethylene-based polymers include at least one ethylene/alpha-olefin interpolymer, which optionally may contain a diene. Such interpolymers include polymers polymerized from at least two different monomers. They include, e.g., copolymers, terpolymers and tetrapolymers. Exemplary interpolymers are prepared by polymerizing ethylene with at least one comonomer, such as an alpha-olefin ($\alpha$-olefin) of 3 to 20 carbon atoms ($C_3$-$C_{20}$), 4 to 20 carbon atoms ($C_4$-$C_{20}$), 4 to 12 carbon atoms ($C_4$-$C_{12}$), 4 to 10 carbon atoms ($C_4$-$C_{10}$), and/or 4 to 8 carbon atoms ($C_4$-$C_8$). The alpha-olefins include, but are not limited to, 1-butene, 1-pentene, 1-hexene, 4-methyl-1-pentene, 1-heptene, and 1-octene. In embodiments, alpha-olefins such as 1-butene, 1-pentene, 1-hexene, 4-methyl-1-pentene, 1-heptene, and/or 1-octene are used. The alpha-olefin may be a $C_4$-$C_8$ alpha-olefin.

Exemplary interpolymers include ethylene/butene (EB) copolymers, ethylene/hexene (EH), ethylene/octene (EO) copolymers, ethylene/alpha-olefin/diene modified (EAODM) interpolymers such as ethylene/propylene/diene modified (EPDM) interpolymers and ethylene/propylene/octene terpolymers. In exemplary embodiments, at least one of the EB, EH and EO copolymers are used in the hot melt adhesive composition.

Exemplary diene monomers include conjugated and nonconjugated dienes. The nonconjugated diolefin can be a $C_5$-$C_{15}$ straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes, such as 5-methylene-2-norbornene (MNB), 5-ethylidene 2 norbornene (ENB), 5-vinyl-2-norbornene, 5-propenyl-2-norbornene, 5-isopropyldene2norbornene, 5-(4-cyclopentenyl)-2-norbornene and 5-cyclohexylidene-2-norbornene. Exemplary nonconjugated dienes include ENB, 1,4-hexadiene, 7-methyl-1,6-octadiene. Suitable conjugated dienes include 1,3-pentadiene, 1,3-butadiene, 2-methyl-1,3-butadiene, 4-methyl-1,3-pentadiene, 1,3-cyclopentadiene.

The ethylene-based polymers used may be substantially free of any diene monomer that typically induces long chain branching (LCB), or the ethylene-based polymers may include such a diene monomer (if costs are acceptable, and desirable interpolymer properties, such as processability, tensile strength and elongation, do not degrade to an unacceptable level). Exemplary diene monomers include, but are not limited to, dicyclopentadiene, NBD, methyl norbornadiene, vinyl-norbornene, 1,6-octadiene, 1,7-octadiene, and 1,9-decadiene. When added, such monomers may be added in an amount within a range from greater than zero to 3 wt %, and/or greater than zero to 2 wt %, based on interpolymer weight.

The ethylene/alpha-olefin interpolymers may be branched and/or unbranched interpolymers. The presence or absence of branching in the ethylene/alpha-olefin interpolymers and, if branching is present, the amount of branching, can vary widely and may depend on the desired processing conditions and the desired polymer properties. Exemplary types of long chain branching (LCB) in the interpolymers include T-type branching and H-type branching.

T-type branching may be obtained by copolymerization of ethylene or other alpha-olefins with chain end unsaturated macromonomers in the presence of a constrained geometry catalyst under the appropriate reactor conditions. The T-type LCB polymers may be produced with constrained geometry catalysts, without measurable gels, but with very high levels of T-type LCB. Because the macromonomer being incorporated into the growing polymer chain has only one reactive unsaturation site, the resulting polymer may contain side chains of varying lengths and at different intervals along the polymer backbone. If extremely high levels of LCB are desired, H-type branching is the preferred method, since T-type branching has a practical upper limit to the degree of LCB. As the level of T-type branching increases, the efficiency or throughput of the manufacturing process decreases significantly until the point is reached where production may become economically unviable.

H-type branching may be obtained by copolymerization of ethylene or other alpha-olefins with a diene having two double bonds reactive with a nonmetallocene type of catalyst in the polymerization process. As the name implies, the diene attaches one polymer molecule to another polymer molecule through a diene bridge; the resulting polymer molecule resembling an H that might be described as more of a crosslink than a long chain branch. H-type branching may be used when extremely high levels of branching are desired. If too much diene is used, the polymer molecule can form so much branching or crosslinking that the polymer molecule is no longer soluble in the reaction solvent (in a solution process), and consequently falls out of solution, resulting in the formation of gel particles in the polymer. Additionally, use of H-type branching agents may deactivate metallocene catalysts and reduce catalyst efficiency. Thus, when H-type branching agents are used, the catalysts used are typically not metallocene catalysts. The catalysts used to prepare the H-type branched polymers in U.S. Pat. No. 6,372,847 are vanadium type catalysts.

In one embodiment, the ethylene/alpha-olefin interpolymer is a homogeneously branched linear or homogeneously branched substantially linear ethylene/alpha-olefin interpolymer. The terms "homogeneous" and "homogeneously-branched" are used in reference to an ethylene/alpha-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers and substantially linear ethylene interpolymers. Exemplary processes for preparing homogeneous polymers are disclosed in, e.g., U.S. Pat. Nos. 5,206,075 and 5,241,031 and International Publication No. WO 93/03093

The weight average molecular weight (Mw) of the ethylene-based polymers may be at least 5,000, at least 10,000, and/or at least 15,000 grams per mole (g/mol). The maximum Mw of the ethylene-based polymers may not exceed 60,000, may not exceed 45,000, and/or may not exceed 30,000 grams per mole (g/mol). The molecular weight distribution or polydispersity or Mw/Mn of these polymers may be less than 5, between 1 and 5, and/or between 1.5 and 4. Weight average molecular weight (Mw) and number average molecular weight (Mn) are well known in the polymer art and can be determined by known methods.

The melt index ($I_2$) of the ethylene-based polymers is from 5 grams per ten minutes (g/10 min) to 3,000 g/10 min. For example, the melt index may be at least 500 g/10 min. The maximum melt index may not exceed 2,000 g/10 min. The melt index is measured by ASTM D1238 (Condition E) (190° C./2.16 kg). The ethylene-based polymer may have a Brookfield viscosity (at 350° F./177° C. as measured using a Brookfield viscometer) of less than 50,000 centipoise (cP). From example, the Brookfield viscosity may be greater than 20,000 cP and less than 50,000 cP (e.g., between 20,000 cP and 50,000 cP).

The density of the ethylene-based polymers may be between 0.850 and 0.900 g/cc. In exemplary embodiments, the density of the ethylene-based polymers is from 0.860 to 0.895, from 0.860 to 0.885, and/or from 0.865 and 0.890. g/cc. Density is determined in accordance with ASTM D792-00, Method 13.

The melting temperature of the ethylene-based polymers may be between 20 and 130° C. The heat of fusion of the ethylene-based polymers may be between 5 and 200 J/g as measured by differential scanning calorimetry (DSC) as described in U.S. Pat. No. 7,199,203.

Exemplary ethylene based polymers include ENGAGE™, AFFINITY™, and NORDEL™ polymers available from The Dow Chemical Company; VISTALON™ and EXACT™ polymers available from ExxonMobil Chemical Company; and TAFMER™ polymers available from Mitsui Chemical.

Propylene-Based Polymer

The propylene-based polymer forms an entirety or a portion of an optional polymer component in the HMA composition. If present, the propylene-based polymer may be present in the hot melt adhesive composition in an amount from 8 wt % to 97 wt %, based on the total weight of the hot melt adhesive composition. When the composition includes a combined total weight of greater than 50 wt % for the tackifier, wax, and/or oil and includes an amount of the ethylene-based polymer, the amount of the propylene-based polymer would be on the lower end of the 8 wt % to 97 wt % range. The propylene-based polymer may have an ethylene content of, for example, less than 20 wt % based on the total weight of the propylene-based polymer (e.g., less than 10 wt %). In exemplary embodiments, the propylene-based polymer may be blended with an ethylene-based polymer in the composition.

Exemplary propylene-based polymers include propylene homopolymers, propylene interpolymers, propylene-based elastomers, as well as reactor copolymers of polypropylene (RCPP), which can contain about 1 to about 20 weight percent ethylene or an alpha-olefin comonomer of 4 to 20 carbon atoms (e.g., $C_2$ and $C_4$-$C_{10}$ alpha-olefins). The propylene-based polymer can be a random or block copolymer, or a propylene-based terpolymer. Exemplary comonomers for polymerizing with propylene include ethylene, 1-butene, 1-pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene.

Exemplary propylene-based polymers include propylene/ ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Optionally, the propylene-based polymer includes a monomer having at least two double bonds such as dienes or trienes. Exemplary diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof. Exemplary embodiments include a butadiene, a hexadienes, and/or an octadiene. Examples include 1,4-hexadiene; 1,9-decadiene; 4-methyl-1,4-hexadiene; 5-methyl-1,4-hexadiene; dicyclopentadiene; and 5-ethylidene-2-norbornene (ENB).

Other unsaturated comonomers include, e.g., 1,3-pentadiene, norbornadiene, and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

Exemplary propylene-based polymers are formed by means within the skill in the art, for example, using single site catalysts (metallocene or constrained geometry) or Ziegler Natta catalysts. Exemplary polypropylene polymers include KS 4005 polypropylene copolymer (previously available from Solvay); KS 300 polypropylene terpolymer (previously available from Solvay); L-Modu™ polymers, available from Idemistu; and VERSIFY™ polymers, available from The Dow Chemical Company. The propylene and comonomers, such as ethylene or alpha-olefin monomers, may be polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98.

The weight average molecular weight (Mw) of the propylene-based polymers used herein may be at least 5,000, at least 10,000, at least 15,000, at least 20,000, at least 30,000, and/or at least 40,000 grams per mole (g/mol). The maximum Mw of the propylene-based polymers may not exceed 60,000, may not exceed 45,000, and/or may not exceed 40,000 grams per mole (g/mol). The molecular weight distribution or polydispersity or Mw/Mn of the propylene-based polymers may be narrow and less than 5, between 1 and 5, and/or between 1.5 and 4. Weight average molecular weight (Mw) and number average molecular weight (Mn) are well known in the polymer art and can be determined by known methods. Propylene-based polymers having a narrow MWD can be advantageously provided by visbreaking or by manufacturing reactor grades (non visbroken) using single-site catalysis, or by both methods.

The propylene-based polymer may have a melt index ($I_2$) from 5 to 25,000 g/10 min, in range of 50 to 15,000 g/10 min, in the range of 200 to 10,000 g/10 min, in the range of 200 to 5,000 g/10 min, and/or in the range of 200 to 3,000 g/10 min. The melt index is measured by ASTM D1238 (Condition E) (190° C./2.16 kg). The propylene-based polymer may have a Brookfield viscosity of less than 50,000 centipoise (cP) (e.g., less than 15,000 cP and/or less than 10,000 cP) at 350° F./177° C. as measured using a Brookfield viscometer. For example, the propylene-based copolymer has a Brookfield viscosity from 800 cP to 19,000 cP, 1,000 cP to 15,000 cP, 1,000 cP to 12,000 cP, 1,000 cP to 10,000 cP, 1,000 to 5,000 cP, 1,000 to 3,000 cP, 1,000 to 2,000 cP, and/or 5,000 cP to 10,000 cP.

The propylene-based polymer may have a density of 0.900 g/cc or less. For example, the density of the propylene-based copolymer is from 0.850 g/cc to 0.900 g/cc, from 0.860 g/cc to 0.895 g/cc, from 0.870 g/cc to 0.890 g/cc, from 0.880 g/cc to 0.890 g/cc, from 0.850 g/cc to 0.880 g/cc, from 0.850 g/cc to 0.870 g/cc, and/or from 0.860 g/cc to 0.870 g/cc. In an exemplary embodiment, the density of the propylene-based polymer is from 0.870 g/cc to 0.900 g/cc. Density is determined in accordance with ASTM D792-00, Method 13.

The propylene-based polymer may have a melting temperature (Tm) typically of less than 150° C. and a heat of fusion (Hf) typically of less than 70 Joules per gram (J/g) as measured by differential scanning calorimetry (DSC) as described in U.S. Pat. No. 7,199,203.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate.

The propylene-based polymers may include propylene/alpha-olefin interpolymer (e.g., propylene/alpha-olefin copolymer), which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 2000/001745, which refers to the isotactic sequence in terms of a triad unit in the copolymer molecular chain determined by $^{13}$C NMR spectra.

Optionally, the ethylene/alpha olefin or propylene/alpha olefin or both may be functionalized. One method to functionalize polymers is to graft functional monomers on to them. By way of example, MAH-g-ethylene/alpha olefin copolymer or interpolymer or MAH-g-propylene/alpha olefin copolymer or interpolymer or both may be used in the HMA composition. The grafted ethylene/alpha olefin may be any of the ethylene/alpha olefins as described above. Likewise, the grafted propylene/alpha olefin may be any of the propylene/alpha olefins as described above. The amount of maleic anhydride constituent grafted onto the polymer chain can be greater than 0.05 weight percent to 2.0 weight percent (based on the weight of the olefin interpolymer), as determined by titration analysis, FTIR analysis, or any other appropriate method. For example, this amount is greater than 0.25 weight percent to 2.0 weight percent, and in yet a further embodiment, this amount is greater than 0.3 weight percent to 2.0 weight percent. In exemplary embodiments, 0.5 weight percent to 2.0 weight percent of maleic anhydride is grafted.

The graft process for MAH-g-ethylene/alpha olefin or MAH-g-propylene/alpha olefin can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It may be preferable for the species that is formed by the decomposition of the initiator to be an oxygen-based free radical. For example, the initiator may be selected from carboxylic peroxyesters, peroxyketals, dialkyl peroxides, and diacyl peroxides. Exemplary initiators used to modify the structure of polymers are listed in U.S. Pat. No. 7,897,689, in the table spanning Col. 48 line 13-Col. 49 line 29, which is hereby incorporated by reference. Alternatively, the grafting process can be initiated by free radicals generated by thermal oxidative process.

Optionally, MAH-g-ethylene/alpha olefin or MAH-g-propylene/alpha olefin or both can be replaced or combined with a variety of grafted polyolefins that comprise radically graftable species. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds.

Exemplary propylene-base polymers include VERSIFY™ polymers (The Dow Chemical Company), VISTAMAXX™ polymers (ExxonMobil Chemical Co.), LICOCENE™ polymers (Clariant), EASTOFLEX™ polymers (Eastman Chemical Co.), REXTAC™ polymers (Hunstman), L-Modu polymers (Idemistu), and VESTOPLAST™ polymers (Degussa).

Tackifiers

The HMA composition can optionally include a tackifier. The amount of the tackifier is from 1 wt % to 70 wt % (e.g., from 5 wt % to 60 wt %, from 10 wt % to 50 wt %, from 15 wt % to 40 wt %, etc.). For example, the amount of tackifier in the HMA composition is greater than zero, or 1 wt %, or 5 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or up to 70 wt % of the total weight of the HMA composition.

The tackifier may have a Ring and Ball softening temperature (measured in accordance with ASTM E 28) from 90° C., or 93° C., or 95° C., or 97° C., or 100° C., or 105° C., or 110° C. to 120° C., or 130° C., or 140° C., or 150° C. The tackifier may modify the properties of the HMA composition such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In other embodiments, the tackifier is used to reduce the viscosity of the composition. In particular embodiments, the tackifier is used to wet out adherent surfaces and/or improve the adhesion to the adherent surfaces.

Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C. to 150° C., and will typically have a viscosity at 350° F. (177° C.), as measured using a Brookfield viscometer, of no more than 2,000 centipoise. They are also available with differing levels of hydrogenation, or saturation, which is another commonly used term. Useful examples include EASTOTAC™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade has a bromine number of 5, the L grade has a bromine number of 3 and the W grade has a bromine number of 1. EASTOTAC™ H-142R from Eastman Chemical Co. has a softening point of about 140° C. Other useful tackifying resins include ESCOREZ™ 5300, 5400, and 5637, partially hydrogenated aliphatic petroleum hydrocarbon resins, and ESCOREZ™ 5600, a partially hydrogenated aromatic modified petroleum hydrocarbon resin all available from Exxon Chemical Co. in Houston, Tex.; WINGTACK™ Extra, which is an aliphatic, aromatic petroleum hydrocarbon resin available from Goodyear Chemical Co. in Akron, Ohio; HERCOLITE™ 2100, a partially hydrogenated cycloaliphatic petroleum hydrocarbon resin available from Hercules, Inc. in Wilmington, Del.; NORSOLENE™ hydrocarbon resins from Cray Valley; and ARKON™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310 LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment, the tackifying agent is free of groups with which the silanol group of either the silane-grafted amorphous polyalpha-olefin or the silane-grafted ethylene/α-olefin multi-block copolymer will react.

Wax and/or Oil

The HMA composition includes at least one selected from the group of a wax and an oil (i.e., a wax and/or oil). The amount of the wax and/or oil is from 1 wt % to 40 wt % (e.g., 1 wt % to 30 wt %, from 3 wt % to 25 wt %, from 5 wt % to 20 wt %, etc.). For example, the amount of the wax and/or oil is greater than zero, or 1 wt %, or 5 wt %, or 10 wt %, or 15 wt %, or 20 wt %, or 25 wt %, or 30 wt %, or up to 40 wt % of the total weight of the HMA composition.

The wax and/or oil may be used to reduce the melt viscosity of the HMA composition. The oil may be a plasticizer. Non-limiting examples of waxes include paraffin waxes, microcrystalline waxes, polyethylene waxes, polypropylene waxes, by-product polyethylene waxes, Fischer-Tropsch waxes, oxidized Fischer-Tropsch waxes, and functionalized waxes such as MAH grafted waxes, hydroxy stearamide waxes and fatty amide waxes. Non-limiting examples of oils include mineral based oils, petroleum based oils, functionalized oils such as glycerol trihydroxyoleate, vegetable oils, fatty oils, other plasticizing oils known in the art, and mixtures thereof. Exemplary oils are hydrocarbon oils that are low in aromatic content and are paraffinic or naphthenic in character.

Additives and Fillers

The HMA compositions can optionally include one or more additives and/or fillers (different and separate from the tackifier, wax, and oil). Nonlimiting examples of additives include plasticizers, thermal stabilizers, light stabilizers (e.g., UV light stabilizers and absorbers), optical brighteners, antistats, lubricants, antioxidants, catalysts, rheology modifiers, biocides, corrosion inhibitors, dehydrators, organic solvents, colorants (e.g., pigments and dyes), surfactants, antiblocking agents, nucleating agents, flame retardants and combinations thereof. Nonlimiting examples of fillers include fumed silica, precipitated silica, talc, calcium carbonates, carbon black, aluminosilicates, clay, zeolites, ceramics, mica, titanium dioxide, and combinations thereof. The type and amount of additives and/or filler is selected to maximize the manufacture, storage, use, and/or economics of the HMA composition. Nonlimiting examples of nucleating agents include 3:2,4-di-p-methyl-dibenzilidene sorbitol.

For example, the HMA compositions may include an antioxidant, in which antioxidant refers to types or classes of chemical compounds that are capable of being used to minimize the oxidation that can occur during the processing of polymers. The term also includes chemical derivatives of the antioxidants, including hydrocarbyls. The term further includes chemical compounds, as described later in the description, of the antioxidant that, when properly combined with the coupling agent (modifying agent), interact with to form a complex which exhibits a modified Raman spectra compared to the coupling agent or modifying agent alone. The amount of the antioxidant may be less than 1 wt %, based on the total weight of the HMA composition. For example, the HMA composition may contain from 0.1 wt %, or 0.2 wt %, or 0.3 wt % to 0.6 wt %, or 0.6 wt %, or 1 wt % antioxidant. Suitable antioxidants include high molecular weight hindered phenols and multifunctional phenols such as sulfur and phosphorous-containing phenol. Representative hindered phenols include: 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-(n- octylthio)ethyl 3,5-di-tert-butyl-4-hydroxy-benzoate; and sorbitol hexa[3-(3,5-di-tert-butyl-4-hydroxy-phenyl)-propionate].

The HMA composition may additionally include a crystallization nucleating agent. An exemplary crystallization nucleating agent is 3:2,4-di-p-methyl-dibenzilidene sorbitol. Other exemplary crystallization nucleating agents include Hyperform® HPN-68L, which is disodium cis-endo-bicyclo (2.2.1) heptane-2-3-dicarboxylate based nucleator and Millad® NX® 8000, which is bis(4-propylbenzylidene) propyl sorbitol based a clarifying nucleating agent.

HMA Compositions

The hot melt adhesive (HMA) compositions include at least the block composite compatibilizer. The block composite compatibilizer is present in an amount from 1 wt % to 60 wt %, based on the total weight of the HMA composition. The HMA composition may include from 1 to 70 wt % of at least one tackifier, based on the total weight of the HMA composition. For example, the amount of the tackifier (when included) may be from 5 wt % to 60 wt %, from 10 wt % to 50 wt %, from 20 wt % to 40 wt %, and/or from 30 wt % to 40 wt %, based on the total weight of the HMA composition. In an exemplary embodiment, the HMA composition includes from 30 wt % to 40 wt % of a tackifier. The HMA composition can further include from 1 to 40 wt % of a wax and/or oil (i.e., such a combined weight of wax and/or oil is from 0 to 40 wt %). For example, the amount of the wax and/or oil (when included) may be from 5 wt % to 40 wt %, from 10 wt % to 35 wt %, from 15 wt % to 30 wt %, and/or from 20 wt % to 30 wt %, based on the total weight of the HMA composition. In an exemplary embodiment, the HMA composition includes from 10 wt % to 35 wt % of a wax. The HMA composition may include from 0 wt % to 5 wt % of other additives, such as an antioxidant. For example, the HMA composition may include from 0.1 wt % to 2 wt % of an antioxidant. The HMA composition may also include from greater to zero to 97 wt % of a polymer component that includes an ethylene-based polymer and/or a propylene-based polymer. For example, the amount of the ethylene-based polymer and/or a propylene-based polymer may be from 1 wt % to 90 wt %, from 5 wt % to 80 wt %, from 10 wt % to 70 wt %, from 15 wt % to 60 wt %, from 20 wt % to 55 wt %, from 25 wt % to 50 wt %, and/or from 30 wt % to 45 wt %.

In an exemplary embodiment, the HMA composition has a heat stress of greater than 50° C., greater than 55° C., greater than 60° C., greater than 65° C., and/or greater than 70° C.

In an exemplary embodiment, the HMA composition has a peel adhesion failure temperature of from 50° C. to 70° C. In another exemplary embodiment, the HMA composition has a shear adhesion failure temperature of from 95° C. to 115° C.

In an exemplary embodiment, the HMA composition has a fiber tear greater than 60% at a temperature from −40° C. to 60° C. In a further exemplary embodiment, the HMA composition has a fiber tear greater than 70% at a temperature from −40° C. to 60° C.

In an exemplary embodiment, the HMA composition has a set time of less than or equal to 5 seconds. In a further exemplary embodiment, the HMA composition has a set time of less than or equal to 3 seconds.

In an exemplary embodiment, the HMA composition has an open time of greater than 10 seconds, greater than 20 seconds, or greater than 30 seconds.

In an exemplary embodiment, the HMA composition has a Tc of greater than 60° C. and less than 100° C.

The HMAs are adhesives that are applied as a melt onto the parts to be adhesively bonded and cure as they cool and solidify. The HMA compositions may exclude a solvent so as to be a non-solved based adhesive. The HMA compositions may be block composite based high melt viscosity, solvent and high melt flow index adhesive compositions.

The HMA compositions may be melt blended and used in the same manner as known HMA compositions. Melt blending of the composition can be effected by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a COPERION™ twin screw mixer, or a BUSS™ kneading continuous extruder. The components are mixed at a temperature and for a length of time sufficient to fully homogenize the mixture. The type of mixer utilized and the operating conditions of the mixer will affect properties of the composition such as viscosity, volume resistivity, and extruded surface smoothness. Melt blending of the HMA with the BC prior to any finishing operation, such as pelletization or granulation, is preferred.

In one embodiment, the process includes subjecting the melt blend of propylene-based polymer and/or ethylene-based polymer, the block composite compatibilizer and, optionally, tackifier, wax and/or oil to homogenization and reducing the melt viscosity of the melt blend. In a further embodiment, the process includes reducing the melt viscosity of the melt blend from 10% to 40%. The homogenization step may include subjecting the melt blend to high pressure homogenization. High pressure homogenization utilizes a high pressure homogenizer.

A "high pressure homogenizer" (or HPH) as used herein, is a device that applies at least 100 bar hydrostatic pressure to a fluid substance and subsequently imposes a restricted flow to the fluid. HPH includes placing the propylene-based polymer or ethylene-based polymer and the block composite compatabilizer, and, optionally, a tackifier and a wax and/or oil, in a melt state (polymer melt) or in an otherwise flowable state. A pressure pump delivers the resultant polymer melt to a valve area of the HPH under high pressure, typically from 100 bar to 2000 bar. In the valve area, a homogenization gap is present between a valve seat and a valve. The homogenization gap is a minute space between the valve seat and the valve. As the polymer melt flows through and exits the homogenization gap, a rapid increase in velocity occurs simultaneously with a rapid decrease in pressure. The intense energy release at the homogenization gap causes turbulence and localized pressure breaking the individual chains of the olefin-based polymer. An impact ring may or may not be directly downstream the homogenization gap. Impingement of the polymer melt with the impact ring imparts further turbulence to the polymer melt exiting the homogenization gap. Bounded by no particular theory, it is believed one, some, or all of the following phenomena occur in the HPH and contribute to the viscosity reduction of the polymer melt: high hydrostatic pressure, shear stress, cavitation, turbulence, impingement, and temperature increase.

The HPH may be a two-stage high pressure homogenizer. The first-stage includes the pressure pump and valve area as described above. The second stage includes a second pressure pump and a second valve area that utilizes from 10% to 20% less pressure than the first stage in order to reduce cavitation and increase turbulent flow.

The HPH may reduce the melt viscosity of the polymer melt from 10%, or 15%, or 20%, or 25% to 30% or 35% or 40%. The reduction in melt viscosity is based on the initial melt viscosity of the polymer melt prior to homogenization. The reduced-viscosity polymer melt continues through a channel of the HPH for movement to the next processing stage. In an embodiment, the process includes introducing a polymer melt having a melt viscosity from 2,500 cP to 20,000 cP into a high pressure homogenizer. The process includes subjecting the polymer melt to high pressure homogenization and forming a polymer melt with a melt viscosity from 1,500 cP to 12,000 cP. In an embodiment, the process includes introducing a formulated hot polymer melt composition having a melt viscosity from 800 cP to 3,500 cP into a high pressure homogenizer. The process includes subjecting the formulated hot polymer melt composition to high pressure homogenization and forming a hot polymer melt composition having a melt viscosity from 480 cP to 2,100 cP.

The present HMA composition is useful for bonding various substrates. In one embodiment, an article includes a first substrate, a second substrate, and an adhesive layer between and in contact with the first substrate and the second substrate. The adhesive layer includes the present HMA composition. The HMA composition may be any HMA composition as described above. In one embodiment, the adhesive layer bonds the first substrate to the second substrate with a lap shear strength greater than 0.5 MPa. In a further embodiment, the adhesive layer bonds the first substrate to the second substrate with a lap shear strength from greater than 0.5 MPa to 1.5 MPa. Lap shear strength is measured in accordance with ISO 4587. The result is reported in megaPascal, or MPa.

The first substrate may be the same material as the second substrate. Alternatively, the second substrate is a different material than the first substrate. Nonlimiting examples of suitable materials for the first substrate and the second substrate include metal (steel, aluminum) metal foil, wood, glass, polymeric material (such as polyolefin, acrylonitrile butadiene styrene (ABS), thermoplastic, elastomer, polycarbonate, polyurethane), polyvinyl chloride, foam/foam laminate, fabric (woven, non-woven, natural, synthetic), textile, paper, and any combination thereof. Non-wovens assembly adhesives, e.g., include the manufacture of sanitary articles such as infant and adult diapers, sanitary napkins, incontinent pads, bed pads, feminine pads, and panty shields.

In an embodiment, the first substrate includes a rigid material and the second substrate includes a flexible material. A "rigid material" is a material that resists deformation in response to an applied force. As used herein, a "flexible material" is a material that has less resistance to deformation than the aforementioned rigid material. In other words, the flexible material exhibits greater pliability or flexibility compared to the rigid material.

In an embodiment, the first substrate includes a rigid material and the second substrate includes a rigid material. The adhesive layer bonds or otherwise adheres the first rigid material to the second rigid material with a lap shear strength greater than 0.5 MPa, or from greater than 0.5 MPa to 1.5 MPa.

In an embodiment, the first substrate includes a rigid material and the second substrate includes a flexible material. The adhesive layer bonds or otherwise adheres the rigid material to the flexible material with a lap shear strength greater than 0.5 MPa, or from greater than 0.5 MPa to 1.5 MPa.

In an embodiment, the first substrate includes a flexible material and the second substrate includes a flexible material. The adhesive layer bonds or otherwise adheres the first flexible material to the flexible second material with a lap shear strength greater than 0.5 MPa, or from greater than 0.5 MPa to 1.5 MPa.

Examples

Test Methods

Density is measured in accordance with ASTM D-792. The result is reported in gamma (g) per cubic centimeter, or g/cc.

Melt index ($I_2$) is measured in accordance with ASTM D-1238 (190° C.; 2.16 kg). The result is reported in grams/10 minutes. Melt flow rate (MFR) is measured in accordance with ASTM D-1238 (230° C.; 2.16 kg). The result is reported in grams/10 minutes.

Molecular weight distribution (MWD) is measured using Gel Permeation Chromatography (GPC). In particular, conventional GPC measurements are used to determine the weight-average (Mw) and number-average (Mn) molecular weight of the polymer and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, 621, (1968)) to derive the following equation:

$$M\text{polyethylene} = a*(M\text{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

For propylene copolymer, the equivalent polypropylene molecular weights of each PS standard were calculated by using the following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N.Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}},$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell and then heated at a rate of approximately 10° C./min. to a temperature of 180° C. for PE (230° C. for polypropylene or "PP"). The sample is kept at this temperature for three minutes. Then the sample is cooled at a rate of 10° C./min to −60° C. for PE (−40° C. for PP) and kept isothermally at that temperature for three minutes. The sample is next heated at a rate of 10° C./min. until complete melting (second heat). The percent crystallinity is calculated by dividing the heat of fusion ($H_f$) determined from the second heat curve by a theoretical heat of fusion of 292 J/g for PE (165 J/g, for PP) and multiplying this quantity by 100 (for example, % cryst.=($H_f$/292 J/g)×100 (for PE)).

Unless otherwise stated, melting point(s) ($T_m$) of each polymer is determined from the highest heat curve (peak Tm), and the crystallization temperature ($T_c$) is determined from the first cooling curve (peak Tc).

Melting Temperature of Polypropylene Copolymer measurement uses DSC to determine the melting point. The temperature at the maximum heat flow rate with respect to a linear baseline is used as the melting point. The linear baseline is constructed from the beginning of the melting (above the glass transition temperature) and to the end of the melting peak. The temperature is raised from room temperature to 200° C. at 10° C./min, maintained at 200° C. for 5 min, decreased to 0° C. at 10° C./min, maintained at 0° C. for 5 min and then the temperature is raised from 0° C. to 200° C. at 10° C./min, and the data is taken from this second heating cycle.

High Temperature Thermal Gradient Interaction Chromatography measurement uses a commercial Crystallization Elution Fractionation instrument (CEF) (Polymer Char, Spain) to perform high temperature thermal gradient interaction chromatography (HT-TGIC, or TGIC) measurement (Cong, et al., Macromolecules, 2011, 44 (8), 3062-3072). A single Hypercarb column (100×4.6 mm, Part#35005-104646, Thermo Scientific) is used for separation. A "¼ inch X ³⁄₁₆ inch ID" stainless steel column with a length of 3 inches packed with 27 micron glass beads (Catalog# GL01918/20-27 um, MO-SCI Specialty Products, LLC, Rolla, Mo., USA) is installed in front of the IR detector in the top oven of the CEF instrument. The experimental parameters are: top oven/transfer line/needle temperature at 150° C., dissolution temperature at 160° C., dissolution stirring setting of 2, sample loading volume of 0.400 mL, pump stabilization time of 15 seconds, a pump flow rate of cleaning column at 0.500 mL/m, pump flow rate of column loading at 0.300 ml/min, stabilization temperature at 150° C., stabilization time (pre, prior to load to column) at 3.0 min, stabilization time (post, after loaded to column) at 1.0 min, SF (Soluble Fraction) time at 5.0 min, cooling rate of 3.00° C./min from 150° C. to 30° C., flow rate during cooling process of 0.00 ml/min, heating rate of 2.00° C./min from 30° C. to 150° C., isothermal time at 150° C. for 15 min, elution flow rate of 0.500 mL/min, and an injection loop size of 140 microliters.

The flow rate during cooling process can be adjusted according to the length of graphite column where all the polymer fractions must remain on the column at the end of cooling cycle.

Samples are prepared by the PolymerChar autosampler at 160° C., for 120 minutes, at a concentration of 4.0 mg/ml in ODCB (defined below). Silica gel 40 (particle size 0.2~0.5 mm, catalogue number 10181-3, EMD) is dried in a vacuum oven at 160° C., for about two hours, prior to use. 2,6-di-tert-butyl-4-methylphenol (1.6 grams, BHT, catalog number B1378-500G, Sigma-Aldrich) and the silica gel 40 (5.0 grams) are added to two liters of ortho-dichlorobenze (ODCB, 99% anhydrous grade, Sigma-Aldrich). This "ODCB containing BHT and silica gel" is now referred to as "ODCB." This ODCB is sparged with dried nitrogen ($N_2$) for one hour prior to use.

The TGIC data is processed on a PolymerChar (Spain) "GPC One" software platform. The temperature calibration is performed with a mixture of about 4 to 6 mg Eicosane, 14.0 mg of isotactic homopolymer polypropylene iPP (polydispersity of 3.6 to 4.0, and molecular weight Mw reported as polyethylene equivalent of 150,000 to 190,000 Daltons, and polydispersity (Mw/Mn) of 3.6 to 4.0, and a DSC melting temperature at 158-159 C with the specified method below), and 14.0 mg of homopolymer polyethylene HDPE (zero comonomer content, Mw reported as polyethylene equivalent as 115,000 to 125,000 Daltons, and polydispersity of 2.5 to 2.8), in a 10 mL vial filled with 7.0 mL of ODCB. The dissolution time is 2 hours at 160° C.

The calibration process (30° C. to 150° C. for Eicosane elution and HDPE elution) consists of the following steps:

(1) Extrapolate the eluting temperature for each of the isothermal steps during elution according to heating rate.

(2) Calculate the delay volume: Shift the temperature (x-axis) corresponding to the IR measurement channel chromatogram (y-axis), so that the Eicosane peak maximum (y-axis) is coincident with elution temperature at 30.0° C. The delay volume is calculated from the temperature difference (30° C.–the actual elution temperature of Eicosane peak maximum) divided by the heating rate of the method, and then multiplied by the elution flow rate.

(3) Adjust each recorded elution temperature with this same delay volume adjustment.

(4) Linearly scale the heating rate, such that the observed HDPE reference has an elution peak maximum temperature of 150.0° C., while the Eicosane elution peak maximum temperature remains at 30.0° C.

(5) The peak temperature of the polypropylene will be observed within the range of 119.3-120.2° C., which is a validation of the calibration method.

Data processing for polymer samples of TGIC is described below.

A solvent blank (ODCB from solvent reservoir) is run at the same experimental conditions as the polymer samples. Data processing for polymer samples includes: subtraction of the solvent blank for each detector channel, temperature extrapolation as described in the calibration process, compensation of temperature with the delay volume determined from the calibration process, and adjustment in elution temperature axis to the 30° C. and 150° C. range as calculated from the heating rate of the calibration.

The chromatogram (measurement channel of IR-4 detector) is integrated with PolymerChar "GPC One" software. A straight baseline is drawn from the visible difference, when the peak falls to a flat baseline (roughly a zero value in the blank subtracted chromatogram) at high elution temperature and the minimum or flat region of detector signal on the high temperature side of the soluble fraction (SF).

The upper temperature integration limit is established based on the visible difference when the peak falls to the flat baseline region (roughly a zero value in the blank subtracted chromatogram). The lower temperature integration limit is established based on the intersection point of the baseline with the chromatogram including the soluble fraction.

The soluble fraction (SF) is defined as the weight percentage of the material eluting including and below 34.0° C.

Materials eluting as soluble fraction % =

$$100 \times \frac{\int_{\text{lower temperature intergation limit}}^{34.0} IR - 4\, dT}{\int_{\text{lower temperature intergation limit}}^{\text{Upper temperature intergation limit}} IR - 4\, dT}$$

High Temperature Liquid Chromatography is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Van der Horst, A.; Schoenmakers, P. J. *J. Chromatogra. A* 2003, 1000, 693). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC

Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;

From 10-651 min, TCB is increased linearly from 0% TCB to 80% TCB.

The injection also triggers the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC

The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit i adjusted to repeat the process.

Each SEC chromatogram n from 1 to 217 yields an X-Y pair in the HTLC chromatogram, where n is the fraction number:

$X_n$ = eluting volume (mL) = $D1$ flow rate $\times n \times t_{switch}$ where $t_{switch}$ = 3 min in the switch time of the 10-port $VICI$ valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram includes Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of LS15/ $IR_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental $LS15/IR_{measure}$ ratio is then converted to $M_w$ through $\Omega$.

Microstructure Index Estimation:

In adsorption based solvent gradient interaction chromatography (SGIC) separation of polymer, block copolymer is eluted later than the random copolymer of the same chemical composition (Brun, Y.; Foster, P. *J. Sep. Sci.* 2010, 33, 3501). In particular, the material used for the microstructure index estimation is separated into two fractions, i.e., a random copolymer and a block copolymer of the same chemical composition. The early eluting fraction, i.e., the first fraction, indicates the comparatively higher presence of random copolymers. The late eluting component, i.e., the second fraction, indicates the comparatively higher presence of block copolymers. The microstructure index is defined as:

$$\text{Microstructure Index} = \frac{1}{\sum_{\text{peak start of component 1}}^{\text{peak end of component 2}} w_n \frac{Comp_{n,random}}{Comp_{n,sample}}}$$

where $w_n$ is weight fraction of fraction n. $Comp_{n,\ random}$ is the chemical composition (wt % P) of fraction n derived from the linear calibration curve. The curve reaches 0 wt % P at 4.56 mL and 100 wt % P at 1.65 mL. The compositions beyond 4.56 mL are considered to be 0 wt % P. The compositions before 1.65 mL are considered to be 100 wt % P. $Comp_{n,\ sample}$ is the chemical composition (wt % P) of fraction n measured from the sample.

$^{13}$C NMR samples are prepared by adding approximately 2.6 g of a 50/50 mixture of tetrachloroethane-d2/orthodichlorobenzene that is 0.025M in chromium acetylacetonate (relaxation agent) to 0.2 g sample in a 10 mm NMR tube. The samples were dissolved and homogenized by heating the tube and its contents to 150° C. The data is collected using a Bruker 400 MHz spectrometer equipped with a Bruker Dual DUL high-temperature CryoProbe. The data is acquired using 160 scans per data file, a 6 second pulse repetition delay with a sample temperature of 120° C. The acquisition was carried out using spectral width of 25,000 Hz and a file size of 32K data points.

Estimation of Block Composite Index is based on showing that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \quad \text{Eq. 1}$$

$$\text{Wt \% } C_{2_{Overall}} = w_{iPPHard}(\text{wt \% } C_{2_{iPP}}) + w_{EPsoft}(\text{wt \% } C_{2_{EPsoft}}) \quad \text{Eq. 2}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$w_{iPPhard} = \frac{\text{wt \% } C_{2_{xyleneinsoluble}} - \text{wt \% } C_{2_{EPsoft}}}{\text{wt \% } C_{2_{iPPhard}} - \text{wt \% } C_{2_{EPsoft}}} \quad \text{Eq. 3}$$

$$w_{EPsoft} = 1 - w_{iPPhard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

Estimation of modified Block Composite Index (MBCI) provides an estimate of the quantity of block copolymer within the block composite compatibilizer under the assumption that the ratio of ethylene-based block to alpha-olefin-based block within the block copolymer is the same as the ratio of ethylene to alpha-olefin in the overall block composite. This assumption is valid for these statistical olefin block copolymers based on the understanding of the individual catalyst kinetics and the polymerization mechanism for the formation of the diblocks via chain shuttling catalysis as described in the specification. This MBCI analysis shows that the amount of isolated PP is less than if the polymer was a simple blend of a propylene homopolymer and polyethylene. Consequently, the polyethylene fraction contains an appreciable amount of propylene that would not otherwise be present if the polymer was simply a blend of polypropylene and polyethylene. To account for this "extra propylene", a mass balance calculation can be performed to estimate the MBCI from the amount of the polypropylene and polyethylene fractions and the weight % propylene present in each of the fractions that are separated by HTLC.

The MBCI is measured by first determining a summation of the weight % propylene from each component in the polymer according to Equation 1, below, which results in the overall weight % propylene/C3 (of the whole polymer). This mass balance equation can be used to quantify the amount of the PP and PE present in the block copolymer. This mass balance equation can also be used to quantify the amount of PP and PE in a binary blend or extended to a ternary, or n-component blend. For the BC, the overall amount of PP or PE is contained within the blocks present in the block copolymer and the unbound PP and PE polymers.

$$\text{Wt \% } C3_{Overall} = w_{PP}(\text{wt \% } C3_{PP}) + w_{PE}(\text{wt \% } C3_{PE}) \quad \text{Eq. 1}$$

where
 $w_{PP}$=weight fraction of PP in the polymer
 $w_{PE}$=weight fraction of PE in the polymer
 wt % $C3_{PP}$=weight percent of propylene in PP component or block
 wt % $C3_{PE}$=weight percent of propylene in PE component or block Note that the overall weight % of propylene (C3) is measured from $C^{13}$ NMR or some other composition measurement that represents the total amount of C3 present in the whole polymer. The weight % propylene in the PP block (wt % $C3_{PP}$) is set to 100 (if applicable) or if otherwise known from its DSC melting point, NMR measurement, or other composition estimate, that value can be put into its place. Similarly, the weight % propylene in the PE block (wt % $C3_{PE}$) is set to 100 (if applicable) or if otherwise known from its DSC melting point, NMR measurement, or other composition estimate, that value can be put into its place.

Calculating the Ratio of PP to PE in the Block Composite:
Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{PP} - \text{wt \% } C3_{PE}} \quad \text{Eq. 2}$$

where
 $w_{PP}$=weight fraction of PP present in the whole polymer
 wt % $C3_{PP}$=weight percent of propylene in PP component or block
 wt % $C3_{PE}$=weight percent of propylene in PE component or block To estimate the amount of the block copolymer (diblock) in the Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unboundPP' and its composition is representative of the PP block present in the diblock copolymer. By substituting the overall weight % C3 of the whole polymer in the left hand side of Equation 3, and the weight fraction of PP (isolated from HTLC) and the weight fraction of PE (separated by HTLC) into the right hand side of Equation 3, the weight % of C3 in the PE fraction can be calculated using Equations 4 and 5. The PE fraction is described as the fraction separated from the unbound PP and contains the diblock and unbound PE. The composition of the isolated PP is assumed to be the same as the weight % propylene in the PP block as described previously.

$$\text{wt \% } C3_{Overall} = w_{PP\,isolated}(\text{wt \% } C3_{PP}) + w_{PE\text{-}fraction}(\text{wt \% } C3_{PE\text{-}fraction}) \quad \text{Eq. 3}$$

$$\text{wt \% } C3_{PE\text{-}fraction} = \frac{\text{wt \% } C3_{Overall} - w_{PPisolated}(\text{wt \% } C3_{PP})}{w_{PE\text{-}fraction}} \quad \text{Eq. 4}$$

$$w_{PE\text{-}fraction} = 1 - w_{PPisolated} \quad \text{Eq. 5}$$

where
 $w_{PPisolated}$=weight fraction of isolated PP from HTLC
 $w_{PE\text{-}fraction}$=weight fraction of PE separated from HTLC, containing the diblock and unbound PE
 wt % $C3_{PP}$=weight % of propylene in the PP; which is also the same amount of propylene present in the PP block and in the unbound PP
 wt % $C3_{PE\text{-}fraction}$=weight % of propylene in the PE-fraction that was separated by HTLC
 wt % $C3_{Overall}$=overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt \% } C3_{PP\text{-}fraction} - \text{wt \% } C3_{PE}}{\text{wt \% } C3_{PP} - \text{wt \% } C3_{PE}} \quad \text{Eq. 6}$$

Where wt % $C3_{PE\text{-}fraction}$=weight % of propylene in the PE-fraction that was separated by HTLC (Equation 4)

wt % $C3_{PP}$=weight % of propylene in the PP component or block (defined previously)

wt % $C3_{PE}$=weight % of propylene in the PE component or block (defined previously)

$w_{PP\text{-}diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the modified block composite index, the amount of diblock copolymer is determined by Equation 7. To estimate the MBCI, the weight fraction of diblock in the PE fraction calculated using Equation 6 is divided by the overall weight fraction of PP (as calculated in Equation 2) and then multiplied by the weight fraction of the PE fraction. The value of the MBCI can range from 0 to 1.0, wherein 1.0 would be equal to 100% diblock and zero would be for a material such as a traditional blend or random copolymer.

$$MBCI = \frac{w_{PP\text{-}diblock}}{w_{PP}} \cdot w_{PE\text{-}fraction} \quad \text{Eq. 7 (MBCI)}$$

Where $w_{PP\text{-}diblock}$=weight fraction of PP in the diblock separated with the PE-fraction by HTLC (Equation 6)

$w_{PP}$=weight fraction of PP in the polymer $w_{PE\text{-}fraction}$=weight fraction of PE separated from HTLC, containing the diblock and unbound PE (Equation 5)

Melt viscosity is determined by ASTM D3236, which is incorporated herein by reference, using a Brookfield Laboratories DVII+ Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 25.4 mm wide, 127 mm wide long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on and set to a shear rate which leads to a torque reading in the range of 40 to 70 percent. Readings are taken every minute for about 15 minutes, or until the values stabilize, and then the final reading is recorded. The results are reported in centi poise (cP).

Heat stress resistance (heat stress) is measured according to the "Suggested Test Method for Determining the Heat Stress Resistance of Hot Melt Adhesives", method T-3006, prepared by the Institute of Packaging Professions (IoPP). To prepare one sample, two cardboard coupons (cut with flutes running in the long direction) having dimensions of 50.8 mm×81 mm are bonded by applying 0.0025 g/mm of HMA with an Olinger Bond Tester. The adhesive is applied perpendicular to the flutes in the center of the shorter coupon and the coupons are bonded such that the adhesive is 19.1 mm from one end of the long coupon. Five replicates are made for each formulation. Samples are loaded into the sample holder with the short coupon end aligned with the edge of the sample holder. The samples are held in place with the wide plate secured by wingnuts. A 200 g weight is placed 100 mm from the bond. The weight is secured by placing the peg on the weight into a hole made in the long coupon. The sample holder is then placed into a convection oven at a set temperature for 24 hours. If at least 80% of the bonds do not fail, then the sample is considered to have passing heat resistance at the test temperature. The oven temperature is varied until the maximum passing heat stress resistance is determined. All new bonded coupon samples should be used for each test temperature. Results are reported as heat stress temperature (° C.).

Tensile Properties is measured using ASTM D-638, which covers the determination of the tensile properties of plastics in the form of standard dumbbell-shaped test specimens when tested under defined conditions of pretreatment, temperature, humidity, and testing machine speed. At least five specimens for each sample is tested in the case of isotropic materials. Condition all the test specimens in accordance with Procedure A of Practice D618. Conduct the tests at the same temperature and humidity used for conditioning. Sample dimensions are then measured using a caliper. A testing machine (such as INSTRON™) is used to detect stress as a function of elongation by placing the specimen in the grips of the testing machine, taking care to align the long axis of the specimen with the grips. Modulus of materials is determined from the slope of the linear portion of the stress-strain curve which is determined using a Class B-2 or better extensometer. For most plastics, this linear portion is very small, occurs very rapidly, and must be recorded automatically. Tensile Strength is calculated by dividing the maximum load in newtons (pounds-force) by the average original cross-sectional area in the gage length segment of the specimen in square meters (square inches). Percent Elongation at Break is calculated by reading the extension (change in gage length) at the point of specimen rupture. Divide that extension by the original gage length and multiply by 100.

Polypropylene equivalent molecular weight calculations are performed using Viscotek TriSEC software Version 3.0.

Shear Adhesion Failure Temperature (SAFT) is measured according to ASTM D-4498 with a 500 gram weight in the shear mode. The tests are started at room temperature (25° C./77° F.) and the oven temperature is ramped at an average rate of 0.5° C./minute. The temperature at which the specimen failed is recorded.

Peel Adhesion Failure Temperature (PAFT)—Peel adhesion failure temperature (PAFT) is tested according to ASTM D 4498 with a 100 gram weight in the peel mode.

The tests are started at room temperature (25° C./77° F.) and the temperature is increased at an average rate of 0.5° C./minute.

Samples for PAFT testing are prepared using two sheets of 40 pound Kraft paper, each of about 6×12 in (152×305 mm) dimensions. On the bottom sheet, lengthwise and separated by a gap of 1 in (25 mm), are adhered in parallel fashion two 1.75 in or 2 in (45 mm or 51 mm) wide strips of a one sided, pressure-sensitive tape such as masking tape. The adhesive sample to be tested is heated to 177° C. (350° F.) and is drizzled in an even manner down the center of the gap formed between the tape strips. Then before the adhesive can unduly thicken two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the adhesive in the gap between the tape strips and the second rod evenly compress the second sheet over the top of the gap and on top of the tape strips. Thus a single 25.4 mm wide strip of sample adhesive is created, between the two tape strips, and bonding the paper sheets. The sheets so bonded are cut crosswise into strips of width 25.4 mm and length of about 76.2 mm, each strip having a (25×25 mm) adhesive sample bond in the center. The strips may then be employed in the PAFT, as desired.

Fiber Tear (%) Percent fiber tear (FT) of HMAs using Inland corrugated cardboard is determined according to a standardized method. A bead of adhesive is applied on to a cardboard coupon (5×6 cm) using an Olinger Bond Tester and a second coupon is quickly placed on top of the adhesive. Light finger pressure for ca. 3 seconds is applied to hold the bond in place. Samples are conditioned for at least 4 hours at room temperature and 50% relative humidity. Next, samples are conditioned at the test temperatures for 5 hrs to 24 hrs. Samples (n=5) are pulled apart by hand and the failure mode (fiber tear, cohesive failure, adhesive failure) is recorded.

Gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):

$$M_{polypropylene} = 0.645(M_{polystyrene}).$$

Open Time and Set Time properties are determined using the Olinger Bond Tester, a mechanical testing device used to form and tear test bonds.

The Olinger Bond Tester is heated to 350° C. (177° C.). The bottom substrate, 2.5" (63.5 mm)×2" (50.8 mm) corrugated board, moves on a track under the adhesive pot which delivers a bead of polymer approximately 1/16" (1.6 mm) to 1/8" (3.2 mm) wide, and 1" (25.4 mm) long. The adhesive pot pressure is increased or decreased in order to maintain consistent bead size. A top substrate, 2.5" (63.5 mm)×2" (50.8 mm), is applied to the bottom substrate, with a pressure of 2 bars. The Olinger has 2 timers, capable of measuring set-time and open-time potential to the nearest second.

Open Time measurement—is the longest time period between adhesive application to one substrate, and the bonding with a second substrate, that results in a 75% fiber-tearing bond. For testing, compression time (or set time) is set to the time determined by set time measurement to achieve 100% fiber tear. Open time is set at 10 seconds and increased in 10 second intervals until less than 50% fiber tear is achieved. The open time is decreased by 5 sec and % fiber tear determined. Finally, open time is changed by 1 second interval to determine the maximum allowable time to achieve 75% or greater fiber tear.

Set Time measurement—is the minimum compression time required to achieve a fiber-tearing bond. For testing, open time is set at 2 seconds (sec). A bond is formed as the top substrate is compressed onto the bottom substrate. After a preset compression time, a tear test is executed as the top substrate is pulled from the bottom substrate. A visual assessment is then made to determine the percentage of fiber tear achieved under the preset test conditions. The set time is changed in one second intervals, determining the time to achieve 100% fiber tear and less than 75% fiber tear. The set time is recorded as the shortest time, to the nearest second, at which a minimum of 75% fiber tear is obtained.

Polymer Characterization Methods, a discussion of the methods used may also be found in, e.g., U.S. Patent Publication Nos. 2011/0313106, 2011/0313107, and 2011/0313108. For example, these methods are used with respect to the block composite materials discussed below.

Preparation of Block Composite Compatibilizer

Samples of BCC are prepared using two continuous stirred tank reactors (CSTR) connected in series. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA 1 are flowed to the first reactor according to the process conditions outlined in Table 1. Then, the first reactor contents are flowed to a second reactor in series. Additional Catalyst, Cocatalyst-1, and Cocatalyst-2 are added to the second reactor.

Catalyst ([[rel-2',2'''-[(1R,2R)-1,2-cylcohexanediylbis(methyleneoxy-O)]bis[3-(9H-carbazol-9-yl)-5-methyl[1,1'-biphenyl]-2-olato-O]](2-)]dimethyl-hafnium) and Cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR® E) obtainable from ExxonMobil Chemical Company and purified through beds of 13-X molecular sieves prior to use.

The process conditions for preparing samples of the BCC are shown below in Table 1.

TABLE 1

Process Conditions for Block Composite Compatibilizer (BCC)

| Condition | 1st reactor | 2nd reactor |
|---|---|---|
| Reactor Control Temp. (° C.) | 130 | 115 |
| Solvent Feed (kg/hr) | 24.15 | 17.5 |
| Propylene Feed (kg/hr) | 0.4 | 1.95 |
| Ethylene Feed (kg/hr) | 1.65 | 0.09 |
| Reactor Propylene Conc. (g/L) | — | 2.0 |
| Reactor Ethylene Conc. (g/L) | 1.5 | — |
| Hydrogen Feed (mL/min) | 0 | 0 |
| Catalyst Flow (g/hr) | 250 | 315 |
| Catalyst Conc. (mmol/kg) | 0.4 | 0.4 |
| Cocatalyst-1 Flow (g/hr) | 250 | 315 |
| Cocatalyst-1 Conc. (mmol/kg) | 0.48 | 0.48 |
| Cocatalyst-2 Flow (g/hr) | 625 | 100 |
| Cocatalyst-2 Conc. (mmol/kg) | 6 | 6 |
| DEZ Flow (g/hr) | 625 | 0 |
| DEZ Concentration (mmol/kg) | 229.5 | 0 |

Referring to the above, samples of the BCC include EP-iPP diblock composite comprising a hard block and a soft block. Measured properties of the resultant BCC are shown below in Table 2. Characterization of the resultant BCC are shown below in Table 3, with reference to the above discussion of modified Block Composite Index.

TABLE 2

Properties for BCC

| | Wt % PP from HTLC Separation | MI (190° C./2.16 kg) | Viscosity (@177° C.) cP | Mn | Mw | Total Wt % $C_2$ | Tm (° C.) | Tc (° C.) | Melt Enthalpy (J/g) |
|---|---|---|---|---|---|---|---|---|---|
| BCC | 17.3 | 500 | 15717 | 10095 | 20805 | 43.4 | 91.6 | 77.4 | 66.7 |

TABLE 3

| Line # | Variable | Source | MBCI BCC |
|---|---|---|---|
| 1 | Overall wt % C3 Total | Measured | 56.6 |
| 2 | wt % C3 in PP block/polymer | Measured | 94.0 |
| 3 | wt % C3 in PE block/polymer | Measured | 20.0 |
| 4 | wt fraction PP (in block or polymer) | Eq. 2 below | 0.495 |
| 5 | wt fraction PE (in block or polymer) Analysis of HTLC Separation | 1-Line 4 | 0.505 |
| 6 | wt fraction isolated PP | Measured | 0.173 |
| 7 | wt fraction PE fraction | Measured | 0.827 |
| 8 | wt % C3 in PE-fraction | Eq. 4 below | 48.8 |
| 9 | wt fraction PP-diblock in PE fraction | Eq. 6 below | 0.389 |
| 10 | wt fraction PE in PE fraction | 1-Line 10 | 0.611 |
| 11 | wt fraction Diblock in PE fraction | 10/Line 4 | 0.786 |
| 12 | Modified Block Composite Index (MBCI) | Eq. 7 below | 0.650 |

Preparation of Polymer Component

According to an exemplary embodiment of the present disclosure, samples of a polymer component that includes a propylene-based polymer were prepared.

Catalyst A is used, which is a hafnium metal complex of a polyvalent aryloxyether catalyst that is hafnium, [[2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl.

Catalyst A and cocatalyst component solutions are metered using pumps and mass flow meters and are combined with the catalyst flush solvent and introduced into the bottom of the reactor. The cocatalyst-1 used is a long-chain alkyl ammonium borate of approximate stoichiometry equal to methyl di(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of about 1/3. For Catalyst A, the cocatalyst-1 is in a molar ratio based on Hf of 1.2/1, and MMAO (25/1 Al/Hf). The cocatalyst-2 used is a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$].

The polymerization process is exothermic. There are about 900 British thermal units (BTUs) are released per pound (2009 kJ/kg) of propylene polymerized and about 1,500 BTUs released per pound (3489 kJ/kg) of ethylene polymerized. The primary process design consideration is the removal of the heat of reaction. The propylene-ethylene (P-E) copolymers are produced in a low-pressure, solution polymerization loop reactor, made up of a 3 inch (76 mm) loop pipe plus two heat exchanges, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures.

The solvent used is a high purity iso-paraffinic fraction available from Exxon under the trademark Isopar E. Fresh propylene is passed through a bed of Selexsorb COS for purification before mixing with a recycle stream containing solvent, propylene, ethylene, and hydrogen. After mixing with the recycle stream, the combined stream is passed through a bed of 75 wt % Molecular Sieve 13X and 25 wt % Selexsorb CD for further purification before using a high pressure 700 psig (4826 kPa) feed pump to pass the contents to the reactor. Fresh ethylene is passed through a Selexsorb COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and the control temperature is reported in the table below. The propylene conversion in the reactor is maintained by controlling the catalyst injection rate. The reaction temperature is maintained by controlling the water temperature across the shell side of the heat exchanger at 85° C. The residence time in the reactor is short (about 10 minutes). The propylene conversion per reactor pass is also reported in the table below.

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer and act as stabilizers to prevent polymer degradation while in storage before subsequent fabrication at an end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

Process conditions for production of the propylene-based polymer and properties of the polymer are provided below in Tables 4 and 5, respectively.

TABLE 4

| Condition | 1st reactor |
| --- | --- |
| Reactor Control Temp. (° C.) | 140 |
| Solvent Feed (lb/hr) | 21.16 |
| Propylene Feed (lb/hr) | 6.09 |
| Ethylene Feed (lb/hr) | 0.46 |
| Propylene conversion (wt %) | 90.5 |
| Hydrogen Feed (SCCM) | 134.9 |
| Catalyst A Flow (lb/hr) | 0.320 |
| Catalyst A Conc. (ppm) | 10 |
| Cocatalyst-1 Flow (lb/hr) | 0.254 |
| Cocatalyst-1 Conc. (ppm) | 106 |
| Cocat.-2 Flow (lb/hr) | 0.125 |
| Cocat.-2 Conc. (ppm) | 32 |

TABLE 5

| Wt % C2* | Density | Viscosity (cP) | Tm (° C.) | Tc (° C.) | Heat of Fusion (J/g) | Mn | Mw | Mw/Mn |
| --- | --- | --- | --- | --- | --- | --- | --- | --- |
| 5.1 | 0..885 | 1558 | 106.78 | 72.1 | 53.4 | 12796 | 31932 | 2.5 |

Preparation of Hot Melt Adhesive Compositions

Hot melt adhesive compositions were prepared in accordance with the methods described above. In addition to the samples of BCC and propylene-based polymer discussed above, other materials used to produce hot melt adhesive compositions are provided in Table 6 below.

TABLE 6

| Component | Specification | | | Source |
| --- | --- | --- | --- | --- |
| | Tackifier-hydrogenated hydrocarbon resin | | | |
| | Property | Test Method | Value/Units | |
| Tackifier Eastotac H115 (H115) | Ring and Ball Softening Point | ASTM E 28 | 115° C. | Eastman |
| | Color, Gardner | ASTM D 1544 | 1.5 | |
| | Color, Gardner (Molten) | ASTM D 1544 | 4 | |
| | Yellowness Index 1 cm cell | ASTM E 313 | 11 | |
| | Density | | 1.04 g/mL | |
| | Viscosity, Brookfield @ 190° C. | | 400 cP | |
| | Form | | Flake | |
| | Acid Number | | <0.1 | |
| | Bulk Density | | 1.04 g/mL | |
| | Bromine Number | | 5 | |
| | Flash Point Cleveland Open Cup | | 257° C. (495° F.) | |
| | Glass Transition Temperature ($T_g$) | | 53° C. (midpoint) | |
| PP Wax Licocene 6102 (6102) | wax-metallocence-catalyzed polypropylene wax, white fine grain | | | Clariant |
| | crystallization temp | | 94.2° C. | |
| | drop point | | 145° C. | |
| | viscosity at 170 C. | | 60 MPa · s | |
| | density | | 0.90 g/cc | |
| | acid value | | 0 mg KOH/g | |

TABLE 6-continued

| Component | Specification | Source |
|---|---|---|
| FT Wax Sasol H1 | Wax-Fischer-tropsch wax, white pellets<br>Congealing Point 96-100° C.<br>drop point 108-114° C.<br>viscosity at 135 C. 8 MPa · s<br>density 0.94 g/cc<br>acid value 0 mg KOH/g | Sasol |
| Irganox ® 1010 (AO) | Antioxidant pentaerythritol tetrakis(3-(3,5-di-tert-butyl-4-hydroxyphenyl)propionate)<br>CAS 6683-19-8<br>Density 1.15 g/cc<br>Flashpoint 297° C. | BASF |

Example HMA composition formulations are provided below in Table 7 in parts by weight, along with their adhesive performance data shown below in Tables 8 and 9.

TABLE 7

| | BCC | Propylene-based polymer | Tackifier (H115) | PE wax (Sasol H1) | PP wax (Licocene 6102) | AO |
|---|---|---|---|---|---|---|
| Comparative Example A | — | 70.00 | 20.00 | 10.00 | — | 0.50 |
| Comparative Example B | — | 70.00 | 20.00 | — | 10.00 | 0.50 |
| Example 1 | 20.00 | 45.00 | 20.00 | 15.00 | — | 0.50 |
| Example 2 | 30.00 | 30.00 | 20.00 | 20.00 | — | 0.50 |

TABLE 8

| | Viscosity @ 177° C. (cP) | SAFT (° C.) | PAFT (° C.) | Open Time (sec) | Set Time (sec) | Heat Stress (° C.) | Fiber Tear % | | | | |
|---|---|---|---|---|---|---|---|---|---|---|---|
| | | | | | | | −40° C. | −17° C. | 0° C. | 23° C. | 60° C. |
| Comparative Example A | 818.33 | 104 | <30 | 35 | 3 | 80 | 13 | 8 | 5 | 6 | 35 |
| Comparative Example B | 1014 | 112.5 | 73.5 | 50 | 13 | 70 | 93 | 83 | 75 | 66 | 70 |
| Example 1 | 1009 | 102.2 | 56.2 | 41 | 3 | 65 | 89 | 85 | 88 | 77 | 84 |
| Example 2 | 1029 | 99.5 | 55.5 | 14 | 2 | 70 | 92 | 68 | 94 | 100 | 85 |

TABLE 9

| | Tc1 (° C.) | Tc2 (° C.) |
|---|---|---|
| Comparative Example A | 68 | 93 |
| Comparative Example B | 70 | N/A |
| Example 1 | 68 | 94 |
| Example 2 | 66 | 95 |

As seen in Tables 8 and 9, hot melt adhesive compositions of Comparative Examples A and B without the block composite compatibilizer exhibited, at elevated temperatures, either good adhesive performance with unacceptable set time or a short set time with poor adhesive performance. In contrast, Examples 1 and 2 of the present disclosure demonstrated that addition of the block composite compatibilizer to a hot melt adhesive composition allowed for not only good adhesive performance at elevated temperatures (e.g., high peel adhesion failure temperature and high fiber tear across a broad temperature range) but also short set time.

What is claimed is:

1. A hot melt adhesive composition, comprising:
   (A) 1-60 wt % of a block composite compatibilizer comprising:
      (i) a hard polymer that includes propylene;
      (ii) a soft polymer that includes ethylene; and
      (iii) a block copolymer having a soft block and a hard block, the hard block of the block copolymer having the same composition as the hard polymer of the block composite compatibilizer and the soft block of the block copolymer having the same composition as the soft polymer of the block composite compatibilizer;
   (B) 1-70 wt % of a tackifier;
   (C) 1-40 wt % of at least one selected from the group of a wax and an oil; and
   (D) from greater than zero to 97 wt % of a polymer component that includes an ethylene-based polymer having a density from 0.86 g/cc to 0.885 g/cc, a melt index ($I_2$) from 5 g/10 min to 3,000 g/10 min, and a Brookfield viscosity of less than 50,000 centipoise (cP).

2. The hot melt adhesive composition as claimed in claim 1, wherein the soft block of the block copolymer includes from 50 wt % to 84 wt % of units derived from ethylene with a remainder derived from propylene.

3. The hot melt adhesive composition as claimed in claim 2, wherein the hard block of the block copolymer includes from 0 wt % to 20 wt % of units derived from ethylene and a remainder derived from propylene.

4. The hot melt adhesive composition as claimed in claim 1, wherein the block composite compatibilizer has a microstructure index of greater than 1 to less than 20.

5. The hot melt adhesive composition as claimed in claim 1, wherein the block composite compatibilizer has a block composite index of greater than 0 and less than 1.0.

6. The hot melt adhesive composition as claimed in claim 1, wherein the block composite compatabilizer has a modified block composite index of greater than 0 and less than 1.0.

7. The hot melt adhesive composition as claimed in claim 1, further comprising from 1-5 wt % of an antioxidant.

8. The hot melt adhesive composition as claimed in claim 1, wherein the block composite compatabilizer has a melt index ($I_2$) from 300 g/10 min to 700 g/10 min.

9. The hot melt adhesive composition as claimed in claim 1, further comprising a propylene based polymer and an ethylene based wax.

10. The hot melt adhesive composition as claimed in claim 1, wherein the composition has a peel adhesion failure temperature of from 50° C. to 70° C.

11. The holt melt adhesive composition as claimed in claim 1, wherein the composition has a fiber tear greater than 60% at a temperature of from −40° C. to 60° C.

12. The hot melt adhesive composition as claimed in claim 1, wherein the composition has a set time of less than or equal to 3 seconds.

13. A hot melt adhesive composition, comprising:
(A) 1-60 wt % of a block composite compatibilizer comprising:
 (i) a hard polymer that includes propylene;
 (ii) a soft polymer that includes ethylene; and
 (iii) a block copolymer having a soft block and a hard block, the hard block of the block copolymer having the same composition as the hard polymer of the block composite compatibilizer and the soft block of the block copolymer having the same composition as the soft polymer of the block composite compatibilizer;
(B) 1-70 wt % of a tackifier;
(C) 1-40 wt % of at least one selected from the group of a wax and an oil; and
(D) from greater than zero to 97 wt % of a polymer component that includes a propylene-based polymer having a density from 0.85 g/cc to 0.90 g/cc and a Brookfield viscosity of less than 50,000 cP.

14. A hot melt adhesive composition, comprising:
(A) 1-60 wt % of a block composite compatibilizer comprising:
 (i) a hard polymer that includes propylene;
 (ii) a soft polymer that includes ethylene; and
 (iii) a block copolymer having a soft block and a hard block, the hard block of the block copolymer having the same composition as the hard polymer of the block composite compatibilizer and the soft block of the block copolymer having the same composition as the soft polymer of the block composite compatibilizer;
(B) 1-70 wt % of a tackifier;
(C) 1-40 wt % of at least one selected from the group of a wax and an oil; and
(D) from greater than zero to 97 wt % of a polymer component that includes:
 an ethylene-based polymer having a density from 0.86 g/cc to 0.885 g/cc, a melt index ($I_2$) from 5 g/10 min to 3,000 g/10 min, and a Brookfield viscosity of less than 50,000 centipoise (cP), and
 a propylene-based polymer having a density from 0.85 g/cc to 0.90 g/cc and a Brookfield viscosity of less than 50,000 cP.

15. An article comprising:
a substrate; and
a hot melt adhesive composition as claimed in claim 1 on at least one surface of the substrate.

* * * * *